United States Patent Office 3,080,247
Patented Mar. 5, 1963

3,080,247
GLASS-REINFORCED ARTICLE
Games Slayter, Newark, Ohio, assignor to Owens-Corning Fiberglas Corporation, a corporation of Delaware
No Drawing. Filed July 22, 1957, Ser. No. 673,155
6 Claims. (Cl. 106—286)

This invention relates to a glass-reinforced article, and, more particularly, to an article comprising a solid mass of an inorganic compound which is capable of plastic deformation, and reinforced with glass fibers or glass flakes.

A need has been recognized for some time for a high temperature gasketing material. To be satisfactory for gasket service, a material must yield sufficiently under stress to enable the accomplishment of a tight seal, but yielding of the material must cease after only limited deformation so that the seal remains tight under service conditions. In addition, the gasketing material must be one which is stable under service conditions. Heretofore, so far as is known, there has been no known effective gasketing material capable of withstanding high temperature service conditions, for example up to about 800° F.

The present invention is based upon the discovery that an article comprising a mass of solid silver chloride, which is an inorganic compound capable of plastic deformation, when reinforced with glass fibers or glass flakes, constitutes an excellent gasket material for high temperature service.

It is, therefore, an object of the invention to provide an article comprising a mass of a solid inorganic compound which is capable of plastic deformation, and is reinforced with glass flakes or fibers.

It is a further object of the invention to provide an article comprising a solid means of silver chloride reinforced with glass fibers or flakes.

It is still another object of the invention to provide an article comprising a solid mass of silver chloride reinforced with glass fibers or flakes.

Other objects and advantages will be apparent from the description which follows, which is intended only to illustrate and disclose, and is in no way to be construed as a limitation on the invention.

According to the invention a reinforced article is provided. Such article comprises a solid mass of a plastic inorganic material reinforced with glass fibers or flakes. Articles have been produced using silver chloride as the inorganic material and have been found to be admirably suited for use as a high temperature gasketing material. Other salts can also be so reinforced, for example, thallium halides such as monothallium chloride, monothallium bromide, or monothallium iodide. Such halides are plastic and fusible, resembling silver chloride in this respect, and are capable of being deformed sufficiently that they can constitute excellent gasket materials, when reinforced with glass fibers or flakes so that deformation is limited. Other inorganic materials which are similar in that they are capable of plastic deformation can also be used in the production of reinforced articles according to the invention.

Silver chloride is a material which melts at 455° C., or about 875° F. When fused, silver chloride can be cast into a desired shape, and, upon cooling, becomes a tough, horny, self-abrasive plastic material which can be worked into various shapes at room temperature, or, otherwise stated, is capable of plastic deformation. A material which is capable of plastic deformation can be described as one which has an extremely low modulus of elasticity. Glass, on the other hand, has a high modulus of elasticity. When silver chloride, for example, is reinforced with glass fibers or glass flakes, therefore, the composite article which results is composed of two different materials of substantially different elastic moduli. When the material is subjected to a stress, the silver chloride tends to undergo plastic deformation, and exerts forces on the glass reinforcement. Because of the high modulus of elasticity of the glass, the reinforcement resists deformation which such forces tend to cause. Because of the ability of the silver chloride to undergo plastic deformation, however, the internal stresses which are established in the body are distributed throughout a substantial number of the glass fibers or glass flakes incorporated therein as reinforcement, with the result that the glass provides highly effective reinforcement, and prevents substantial deformation of the silver chloride, even by forces which would cause plastic flow of the material, if unreinforced.

In view of the discussion of the preceding paragraph concerning the mechanism of reinforcement of silver chloride with glass fibers or flakes, it will be appreciated that thallium halides and other inorganic compounds which are capable of plastic deformation can similarly be reinforced to produce articles useful, for example, as gasketing materials. In the case of silver chloride, the glass reinforcement also tends to prevent crystallization, which occurs at a comparatively rapid rate in a massive article produced from fused silver chloride, and unreinforced. It is known that thallium halides also tends to form crystals, and it is believed that glass fiber or glass flake reinforcement will tend to prevent such crystallization.

Reference has been made herein to reinforcement in the form of glass flakes and glass fibers. Such reinforcement can be described generically, and is so described in the appended claims, as reinforcement in the form of a plurality of bodies of glass in a physical form in which the glass has a high ratio of surface to volume, since this ratio is large both in fibers and in flakes, but is small, by comparison, in other physical forms in which glass is known and might be used as reinforcement.

The relative proportions of glass flakes or fibers, or both, and silver chloride, or other inorganic compound capable of plastic deformation, can be varied within relatively broad limits in an article according to the invention. Ordinarily, it is preferrd that the glass reinforcement constitute at least about 5 percent of the total article so that a significant improvement is achieved by virtue of the reinforcement. Where optimum physical properties are desired in the article, the amount of glass reinforcement is preferably at least 10 percent, and most desirably at least 20 percent thereof. It is usually difficult to produce articles containing extremely high percentages of glass fibers or flakes, and, therefore, it is preferred that the amount of glass reinforcement be not more than 50 percent of the article, and most preferred that it be not more than about 30 percent.

The terms "percent" and "parts" are used herein, and in the appended claims, to refer to percent and parts by weight, unless otherwise indicated.

One specific way for producing an article in accordance with the invention is described in the following example, which is presented solely for the purpose of further illustrating and disclosing, and is in no way to be construed as limiting the invention. Other methods for producing such an article will be apparent to one skilled in the art.

*Example*

Rods of silver chloride reinforced with glass fibers were produced according to the following procedure:

A glass tube having an internal diameter of approximately 0.32 inch was packed with a plurality of glass fiber slivers disposed in parallel arrangement, and extending longitudinally of the tube. One end of the tube was then connected to a vacuum pump, and the other end was connected to a supply of liquid silver chloride. The vacuum pump was operated to draw a vacuum within the tube, with the result that pressure acting on the liquid silver chloride forced the same into the fiber-packed tube, and into contact with the fibers contained therein. When the tube was filled with molten silver chloride, operation of the vacuum pump was stopped, and the silver chloride was allowed to solidify. The resulting article was then removed from the tube, and was found to be smooth, to have a slippery feel, and to have a metallic ring when struck a sharp blow. The rod was not flexible under manually applied stresses, and seemed to be non-abrasive in nature. The flexural strengths of ten rods so produced were measured and were found to range from 42,000 to 43,000 pounds per square inch. As is indicated above, the properties of the rods were such that they are well suited for use as gasketing material for high temperature service.

It will be apparent that various changes and modifications can be made from the specific details disclosed herein without departing from the spirit and scope of the attached claims.

What I claim is:

1. An article consisting essentially of a continuous mass of a thallium halide, in a solid state, reinforced with a plurality of bodies of glass in a physical form in which the glass has a high ratio of surface to volume, which physical form is selected from the group consisting of flakes and fibers, and wherein the glass constitutes at least 5 percent of the article.

2. An article consisting essentially of a continuous mass of monothallium iodide, in a solid state, reinforced with a plurality of bodies of glass in a physical form in which the glass has a high ratio of surface to volume, which physical form is selected from the group consisting of flakes and fibers, and wherein the glass constitutes at least 5 percent of the article.

3. An article consisting essentially of a continuous mass of silver chloride, in a solid state, reinforced with a plurality of bodies of glass in a physical form in which the glass has a high ratio of surface to volume, which physical form is selected from the group consisting of flakes and fibers, and wherein the glass constitutes at least 5 percent of the article.

4. An article consisting essentially of a continuous mass of silver chloride, in a solid state, reinforced with fibrous glass, the glass constituting at least 5 percent of the article.

5. An article consisting essentially of a continuous mass of silver chloride, in a solid state, reinforced with from 10 percent to 50 percent of fibrous glass, based upon the total weight of the article.

6. An article consisting essentially of a continuous mass of silver chloride, in a solid state, reinforced with from 20 percent to 30 percent of fibrous glass, based upon the total weight of the article.

References Cited in the file of this patent

UNITED STATES PATENTS

| | | |
|---|---|---|
| 346,841 | Chormann | Aug. 3, 1886 |
| 1,903,620 | Esslinger | Apr. 11, 1933 |
| 2,158,337 | Rasmussen | May 16, 1939 |
| 2,592,521 | Thompson | Apr. 8, 1952 |
| 2,610,957 | Steinman et al. | Sept. 16, 1952 |

FOREIGN PATENTS

| | | |
|---|---|---|
| 463,606 | Great Britain | Apr. 2, 1937 |
| 844,748 | France | July 31, 1939 |